US006728351B2

United States Patent
Ahlstrom et al.

(10) Patent No.: US 6,728,351 B2
(45) Date of Patent: Apr. 27, 2004

(54) ACCESS CONTROL SYSTEM HAVING TENANT CODES THAT MAY BE SELECTIVELY DISPLAYED

(75) Inventors: John F. Ahlstrom, Chatsworth, CA (US); Harvey Stone, Reseda, CA (US)

(73) Assignee: The Chamberlain Group, Inc., Elmhurst, IL (US)

( * ) Notice: Subject to any disclaimer, the term of this patent is extended or adjusted under 35 U.S.C. 154(b) by 209 days.

(21) Appl. No.: 09/984,343

(22) Filed: Oct. 29, 2001

(65) Prior Publication Data

US 2003/0081747 A1 May 1, 2003

(51) Int. Cl.[7] .............................................. H04M 11/00
(52) U.S. Cl. .............................. 379/102.06; 379/167.06
(58) Field of Search ....................... 379/102.06, 102.07, 379/102.01, 110.01, 167.05–167.11

(56) References Cited

U.S. PATENT DOCUMENTS 5,475,741 A     12/1995   Davis et al.
6,041,106 A     3/2000    Parsadayan et al.
6,317,489 B1 *  11/2001   Parsadayan ............ 379/102.06

FOREIGN PATENT DOCUMENTS

EP          0245 709 A1    4/1987

OTHER PUBLICATIONS

Search Report for British patent application GB 02 251 51. 0 completed on Apr. 11, 2003.
Owner's Manual—*1803PC, 1815, 1817—PC Programmable Telephone Entry Systems*, DoorKing, Inc., Mar. 2001.

* cited by examiner

Primary Examiner—Wing Chan
(74) Attorney, Agent, or Firm—Fitch, Even, Tabin & Flannery (57) ABSTRACT

The present invention is an access control system such as a telephone entry system (TES) wherein tenant codes are selectively displayed and therefore, tenant codes that are not selected for display are not listed in a system tenant code directory. Tenants may control who knows that they live in the building and, therefore, control who can get in touch with them. Thus, tenants may avoid having their name displayed on the Access Control System. Tenants still may have a unique number in the index without having their name displayed, keeping their name unlisted.

22 Claims, 6 Drawing Sheets

Fig. 8 ered to by an access control system. However,
ACCESS CONTROL SYSTEM HAVING TENANT CODES THAT MAY BE SELECTIVELY DISPLAYED

RELATED APPLICATIONS

The present invention is related to U.S. patent application Ser. No. 09/984,341 entitled "A SWITCH MODE POWER SUPPLY FOR A TELEPHONE ENTRY SYSTEM OR THE LIKE" to J. Ahlstrom; U.S. patent application Ser. No. 09/984,342 entitled "ACCESS CONTROL SYSTEM HAVING A PROGRAMMABLE AUTOMATIC NOTIFICATION FEATURE" to J. Ahlstrom et al.; and U.S. patent application Ser. No. 09/984,344 entitled "ACCESS CONTROL SYSTEM IN SEAMLESS COMMUNICATION WITH PERSONNEL MANAGEMENT SYSTEMS AND THE LIKE" to W. Dow et al.; all filed concurrently herewith and assigned to the assignee of the present invention.

BACKGROUND OF THE INVENTION

1. Field of the Invention

The present invention is related to access control systems and more particularly to maintaining tenant privacy in a building with access controlled by an access control system.

2. Background Description

Apartment buildings, office buildings, condominium complexes, gated residential communities, industrial parks and other secured locations often include an entrance access control system. One type of access control system, known as a telephone entry system (TES), provides building security as well as tenant access control to a particular building, apartment complex, etc. The access control system controls entry at one or more other building entry points, e.g., doors, garage doors, etc. A typical access control system includes a main control unit located at a primary entrance and, depending on the size of the structure or area being monitored, additional remote units may be provided to control remotely located doors. The access control system may also monitor the connected entry points for unauthorized access. For a TES type access control system visitors wishing to enter the building/complex contact tenants or other building personnel over the TES, that are capable of admitting the visitor by remotely unlocking the entrance, e.g., from the tenant's apartment.

The main control unit controls the main building entrance and may include a keypad and auto-dialer and be connected to a public telephone line. Remote units, typically communicate with the main unit to provide remote access to authorized personnel. The main unit can identify tenants seeking entry by a personal access code, authorize entry, monitor for unauthorized entry at the remote doors, etc. A tenant directory may be displayed on the control unit itself or on an adjacent sign. The directory includes tenant codes that are corresponding directory code numbers for each person, business or for other entities in the building (e.g., corporate departments, business employees, or other building tenants) authorized to unlock the entrances. A visitor to the building may display the tenant code directory and view a directory code for each tenant.

When a visitor enters a tenant code into the keypad, the main control unit automatically dials the corresponding tenant's telephone number. Then, the called tenant has an opportunity to establish the identity of the visitor. The tenant, using the same everyday telephone upon which the call was received, unlocks the entrance, e.g., by pressing a predetermined number on the telephone keypad. However, some tenants may not wish to make their tenancy readily ascertainable to passing strangers. Also, tenants may have an unlisted telephone number and publishing their particular access code would somewhat frustrate their desire to be unlisted.

Thus, there is a need for maintaining tenant privacy.

SUMMARY OF THE INVENTION

It is a purpose of the present invention to maintain tenant privacy at a building with access controlled by an access control system;

It is another object of the invention to selectively allow building tenants to prevent having an associated tenant code listed in an access control system directory.

The present invention is an access control system such as a telephone entry system (TES) wherein tenant codes are selectively displayed and, therefore, tenant codes that are not selected for display are not listed in a system tenant code directory. So, tenants may control who knows that they live in the building and, therefore, control who can get in touch with them. Thus, tenants may avoid having their name displayed on the Access Control System. Tenants still may have a unique number in the index without having their name displayed, keeping their name unlisted.

Advantageously, the present invention allows unlisted numbers within an Access Control System. Tenants wanting to control who can contact them have a private tenant number to which they may restrict knowledge. Thus, tenants may control distribution of their number in any way that they choose.

BRIEF DESCRIPTION OF THE DRAWINGS

The foregoing and other objects, aspects and advantages will be better understood from the following detailed preferred embodiment description with reference to the drawings, in which.

DESCRIPTION OF THE PREFERRED EMBODIMENTS

Figure 1:
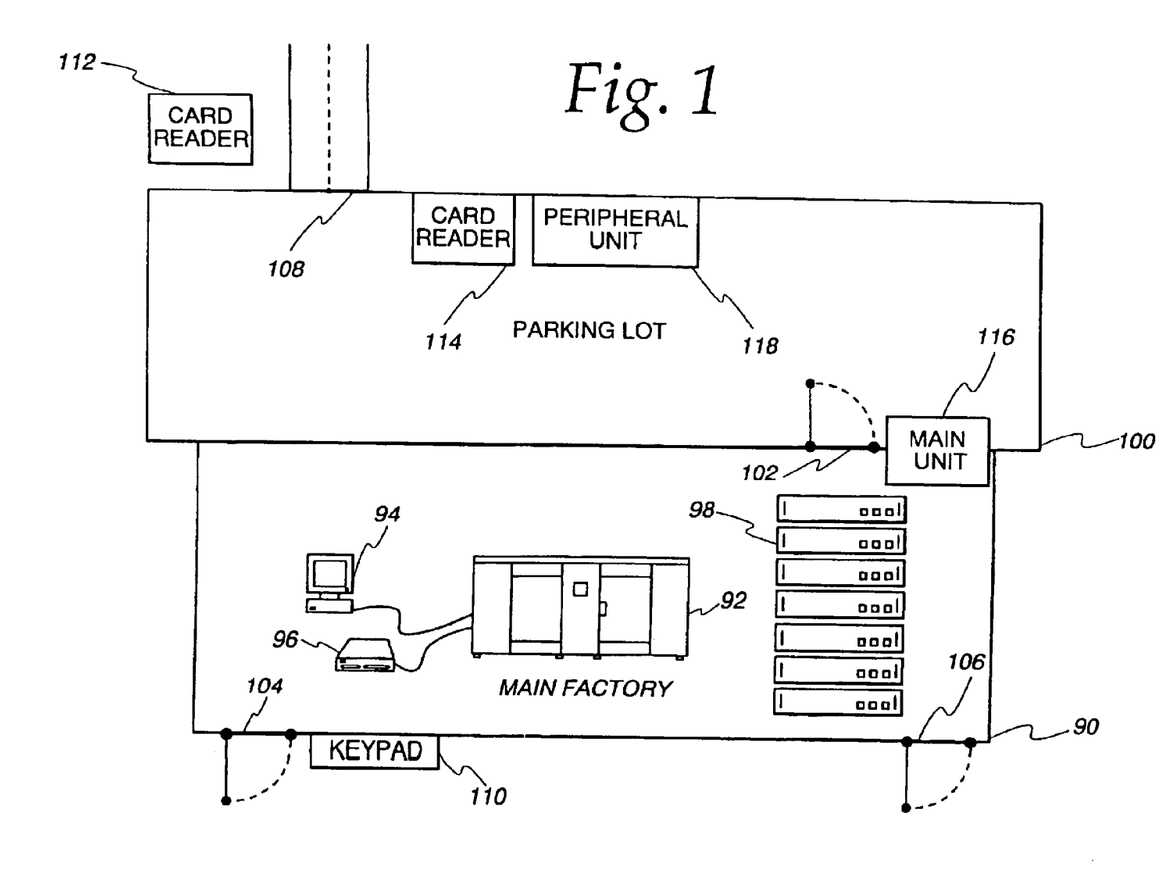
FIG. 1 shows an example of a typical building such as a factory with access controlled by a simple telephone entry system (TES) according to the preferred embodiment of the present invention.

Turning now to the drawings and, more particularly, FIG. 1 shows an example of a typical site, a factory building 90 in this example, with access controlled by a preferred embodiment access control system, such as a telephone entry system (TES) capable of maintaining unlisted tenant directory codes according to the present invention. In this example, the access control system is in communication with one or more general purpose computer 92. A computer terminal 94, such as a personal computer or the like, and a modem 96 are attached to the general purpose computer 92. Product assembly lines 98, shown for example only, are located at one end of the factory 90. A parking lot 100, e.g., for employee parking, is located at the front of the building 90. The building 90 includes a front entrance 102, a rear entrance 104 and an emergency exit 106 with attached sensors (not shown) indicating whether the door at emergency exit 106 is open or closed. In this example, the front building entrance 102 provides passage to/from the parking lot 100 and a gate 108 provides auto entry/exit to the parking lot 100. A code entry unit, remote entry keypad 110, is located at rear entrance 104 for entering access codes. The gate 108 includes entry and exit code entry units, external card reader 112 for requesting entry and internal card reader 114 for requesting exit. A main control unit 116 controls building entry directly at each of the front entrance 102 and rear entrance 104 and monitors sensors at the rear emergency exit 106. Further, to allow for the distance of the gate 108 from the main unit 116, a peripheral unit 118 controls the gate 108 and communicates with the main unit 116. The peripheral unit 118 passes entry/exit requests from the gate card readers 112, 114 to the main unit 116 and, upon receipt of an authorization response to such a request, opens/closes the gate 108.

Tenant or contact codes such as for contacting departments within a business or tenants in an apartment complex, may be displayed on the main unit 116. However, a particular tenant or department may prevent display of an associated code. The code sequence length for granting access is arbitrary and depends on the configuration of the particular unit. The preferred embodiment TES manages the admission process, recalling and dialing tenant telephone numbers in response to the contact code and then, responding to signals from the tenant's telephone to unlock a door, open a gate or open another connected device.

These directory contact codes prompt the system to call a particular tenant. Each contact code entered into the main control keypad points to the telephone number of a corresponding tenant. A visitor may enter a tenant contact code into the main unit to call and communicate with an associated tenant. Tenant contact codes can be linked to the tenant's card or entry code, and may be deleted once the tenant leaves the building, e.g., moves out, thereby removing the tenant's building access authorization. Thus, each tenant must be associated with at least one individual contact code. All codes are not required to be displayed in the directory display, i.e, some codes may be unlisted.

According to the preferred embodiment of the present invention, tenants that desire privacy and wish to restrict awareness that they are tenants of the building may use this unlisted number feature to prevent their contact code from being displayed. So, unlisted contact code numbers are not listed in the display directory and are not displayable. Thus, only visitors that know an unlisted contact code can enter the code to contact the tenant. Without knowing the unlisted contact code, visitors do not have information to contact the tenant. Also, tenants may select a tenant Do-Not-Disturb (DND) feature to block calls to a tenant during selected period.

So for example, where the preferred TES controls access to an apartment complex, a visitor arriving at the building or complex, can find a tenant's contact code on the main control unit 116 directory, provided the code is not unlisted. Then, the visitor may select or enter the code, and the preferred embodiment system will dial a tenant's associated telephone number without the visitor knowing the tenant's telephone number. Upon answering the call, the tenant may initiate one of four actions by dialing a number on the telephone. These actions may include, for example, activating a first relay to open a front door or entry gate; activating a second relay to open another door or enable whatever device is controlled by the second relay, e.g., an elevator; and, continue to talk to the visitor.

Card readers 112, 114 may include well known Weigard protocol card readers, Barrium Ferrite and Proximity Readers or ClikCard Receivers, for example. Access control system and TES are used interchangeably herein. The present invention is described herein with reference to a TES type of access control system, for example only and not as a limitation. Further, although general purpose computer 92 is shown here as being located on site, this is for example only. It is understood that computer 92 may be located at a remote site (not shown) and in communication with the access control system over public or private telephone lines using a modem or any other appropriate communications media.

The preferred embodiment TES and the general purpose computer 92 communicate with each other seamlessly. Entries made in the TES are seamlessly transferred to the general purpose computer 92 and updated in corresponding databases stored therein. Likewise entries made in selected databases within the general purpose computer or in other types of selected files are reflected in the TES, seamlessly, and without requiring manual intervention. Thus, for example, employees may be added or removed from factory personnel logs stored in the general purpose computer and, as each is entered or removed, the corresponding entry code in the TES is added or deleted. In a more particular example, a Human Resources person sitting at a terminal 94 may delete an employee from a list of employees in the general purpose computer 92. Upon such deletion, the general purpose computer 92 contacts the TES using modem 96, and corresponding employee records stored in the main unit 116 are deleted.

Furthermore, other types of entries, such as holidays, may be changed in the main computer 92 and those changes reflected in the TES. So, for example, in a first year Independence Day may fall on a Tuesday. That year the company may decide to also make Monday, the third of July, a holiday. A Human Resources person enters the selection of July $3^{rd}$ and $4^{th}$ as holidays in the personnel system and those holidays are automatically communicated to the main unit 116. In the following year, which is a leap year, Independence Day falls on a Thursday. So, this following year the fifth of July is also selected as a holiday. Thus, the Human Resources person deletes July $3^{rd}$ as a holiday in the personnel system and adds July $5^{th}$ as a holiday. The personnel system causes computer 92 to transmit the deletion of July $3^{rd}$ and the addition of July $5^{th}$ as holidays to the main control unit 116. In response to each set of holiday dates, the TES restricts access to the main building during holidays to selected management personnel, e.g., to the factory manager and assistant manager. On normal work days, the TES opens the front gate 108 at 8:00 a.m. and closes it at 6:30 a.m. However, during the selected holidays, July $3^{rd}$ and $4^{th}$ of the first year and July $4^{th}$ and $5^{th}$ of the second, the front gate 108 remains closed with access provided only through the card reader 112 and exit only through card reader 114.

In addition, information may be passed the other way as well from the TES to the main computer 92. The TES, monitoring rear entrance 106 may receive an indication that the rear door is open, e.g., from the door ajar sensor. Immediately, the TES transmits that information to the general purpose computer 92. In response, the general purpose computer 92 displays a message on the computer terminal 94 to a security guard, alerting the guard that the rear door has been opened. In addition, in response to the rear door 106 being opened, the TES may sound a building alarm and dial an emergency number, to call the fire department for example. Coincidentally, as the TES sounds the alarm and calls the fire department, it reports this information to the general purpose computer 92 which may display the information to appropriate personnel.

Building tenants can access the building using the preferred embodiment TES, which controls entrances and selectively grants access. Typically, each tenant has an assigned access code and/or card to access the complex. As the tenant enters a corresponding access code on a keypad or, cards in using a card reader (connected to one of the main control units 116 or peripheral unit 118). The system checks to determine if the entered access code is valid. If the code is valid and access is not restricted for the particular entrance, the system grants access by unlatching the entrance, e.g., opening a front gate or garage door.

Access codes are enabled programmably to allow tenants to enter or exit through one or more gate(s) or door(s). Entrances are symbolically linked to the tenant's access code and links may be deleted when a tenant moves out. Entry cards, like access codes authorize entry. Thus, swiping the card through an entry card reader or touching a smart card to a smart card reader, provides access at an authorized entrance. Authorizations for entry cards as well as access codes may be restricted to certain entrances and for selected time periods or generally authorized for all building entrances and at any time. A valid door structure (VDS) grants tenant access to a set number of doors, and may deny access to other doors. So, for example, a VDS may be created authorizing tenant access to the front and back door, but not to a manager's door or a garage door. A second VDS may be created for the manager to authorize access to all doors.

Also, access restrictions may be placed on codes to reduce the possibility of a card or code being used by more than one person. Period restricted or time zone access may limit the times of day that access is allowed through a particular entry location, e.g., access may be restricted only to the front entrance of a building during night hours. An anti-pass back restriction may be one of two types, either true or timed anti-pass back. True anti-pass back requires that each entry be matched by an exit before re-entry is allowed. Timed anti-pass back requires that a defined period of time pass before the same card or code may be used again for re-entry by the same reader or keypad. If the timed anti-pass back feature is set to time out in sixty seconds, for example, the system will not grant access to anyone trying to re-enter using the same code or card at the same reader until, for example, sixty seconds have elapsed from the most recent entry. An anti-pass back forgiveness feature may be used, such that after expiration of the forgiveness period, entry using the same code or card may be resumed. So, for example, after midnight entry may be made re-using a blocked code or card to the same building.

Likewise, a Strikes-And-Out feature may be included to prohibit unauthorized persons from guessing an entry code. The Strikes-And-Out feature allows a selected number of erroneous code entries before temporarily disabling a code reader at a particular door for a specified amount of time.

For convenience, use frequency limits or period limits may be placed on cards or access codes, to allow issuance of temporary cards or access codes that are authorized for limited numbers of uses or for a limited period of time. Use limited codes or cards grant entry for set number of uses. Thus, a code or card may be authorized for sixty uses over the course of a month, for example. Once the card use exceeds that sixty-use limit, the code or card is no longer valid and the card may be discarded. Period limits may include date limitation wherein cards or access codes are authorized for entry until a specified date, i.e., an expiration date. For example, a tenant may be scheduled to move out of the building on December $1^{st}$ of the current year. The expiration date for that tenant's card or access code may be set for December $1^{st}$ and thereafter, access to the building is not authorized for either the card or access code. First-Use time limited cards or access codes authorize entry for a set number of days/hours/minutes after first use. For example, a tenant may have access for an unspecified week which begins to run upon the first entry. After the first entry, the tenant can use the card/code to enter and exit the building for a week until the period expires and the card/code is no longer valid. Start-Now time limited cards/codes are similar to First-Use time limited cards/codes providing authorized access over a period of days/hours/minutes beginning immediately.

Figure 2:
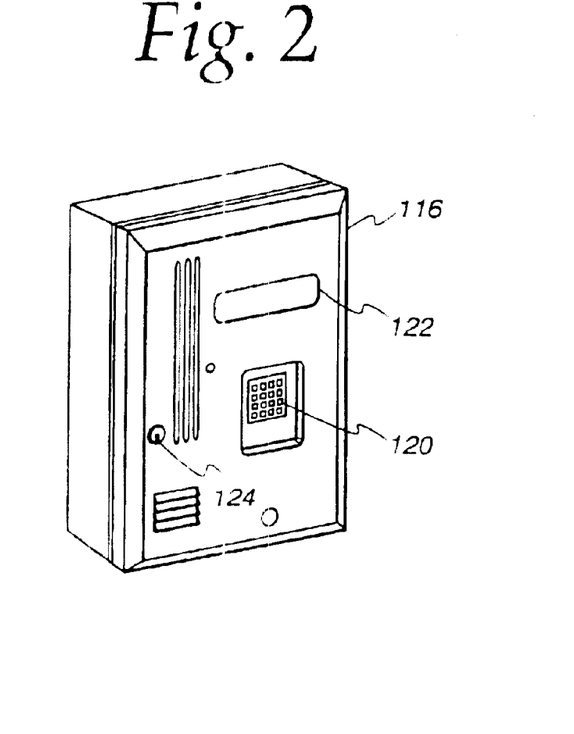
FIG. 2 shows an example of a main control unit.
Figure 3:
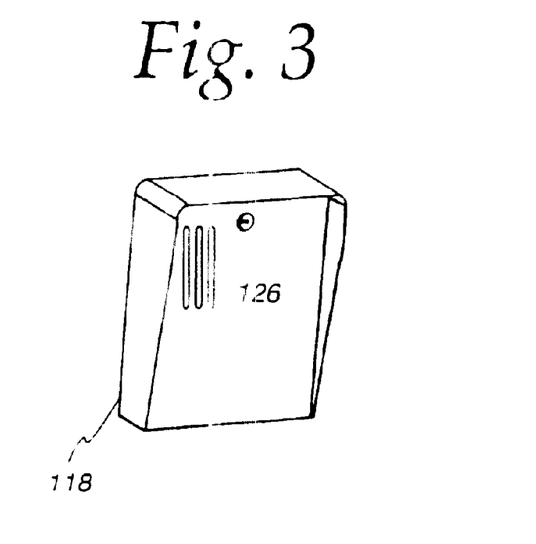
FIG. 3 is an example of a peripheral control unit.

FIG. 2 shows an example of a main control unit 116 and FIG. 3 shows an example of a peripheral unit 118. The main control unit 116 houses a main system motherboard (not shown) as well as TES software and building/tenant related data. A keypad 120 is included on the main unit 116 for numeric code entry, e.g., entering access codes or tenant phone numbers to contact tenants. A display 122 is provided for displaying telephone numbers stored in the system, as well as providing interactive information and for viewing any diagnostic information that might be displayed during entry or normal maintenance. Both the main control unit 116 and the peripheral unit 118 include keyed access points 124, 126. Unlocking each unit's housing provides access to system circuits contained within the particular unit 116, 118.

The main unit control 116 includes four internal relays and preferably is capable of supporting four (4) peripheral units 118. Further, in this embodiment each peripheral unit 118 includes four relays. Thus, besides pedestrian access control, relays can by employed for generating alarms, bypassing an alarm, providing elevator access control, controlling close circuit television (CCTV), controlling a gate operator and, for heating and air-conditioning system control. Each of the main control unit 116 and peripheral units 118 also include an interface for an exit request sensor and door position sensor. When attached, the exit request sensor senses when a request is placed for exit through the door, e.g., a button is pushed to request exit. A door position sensor senses when a door has been pried open or is otherwise open and/or remains open, e.g., for more than a minute after a relay deactivation.

Messages such as greetings, general information or warnings may be programmed into the main unit 118 for display on the display 122. A series of system menus are provided on the display 122 for manually programming the preferred embodiment TES. These menus are navigable using a menu prompt, scrolling through each menu level to identify and select an active value that corresponds to a desired menu action. The menus may be navigated by pressing numbers or characters on the keypad 120 that prompt a currently displayed option. Command prompts may be identified as appropriate, such as using a designated character, underscoring, highlighting or placing a cursor below the prompt. Further, depending on the number of displayable lines on the main control unit display 122, scrolling up and down the menu lines may be required as the number of current menu lines may exceed the number of lines that may be displayed. Further, the preferred embodiment TES may convert messages to a foreign language, e.g., by pressing a main control keypad 120 number to select displaying messages in Spanish.

A manager call button 128 may be included on the keypad 120. Pressing the manager call button 128 prompts the system to call a preselected manager's telephone number. Up to four different manager telephone numbers can be accompanied with a call schedule for each number such that calls are placed to selected ones of the manager phone numbers depending on the time of day, for example. A programmable manager's call schedule, sets times when visitors are allowed to contact the manager. Call schedules for up to four managers may be programmed with each manager having up to four sub-schedules and each sub-schedule having up to four segments. In addition, the manager call button may be selectively disabled to prevent visitors from contacting the manger from the main unit during any period that it is disabled. So, for example, the manager call button may be disabled between midnight and 5:00 AM and the preferred embodiment TES would not respond to pressing the Manager call button during those hours.

Figure 4:
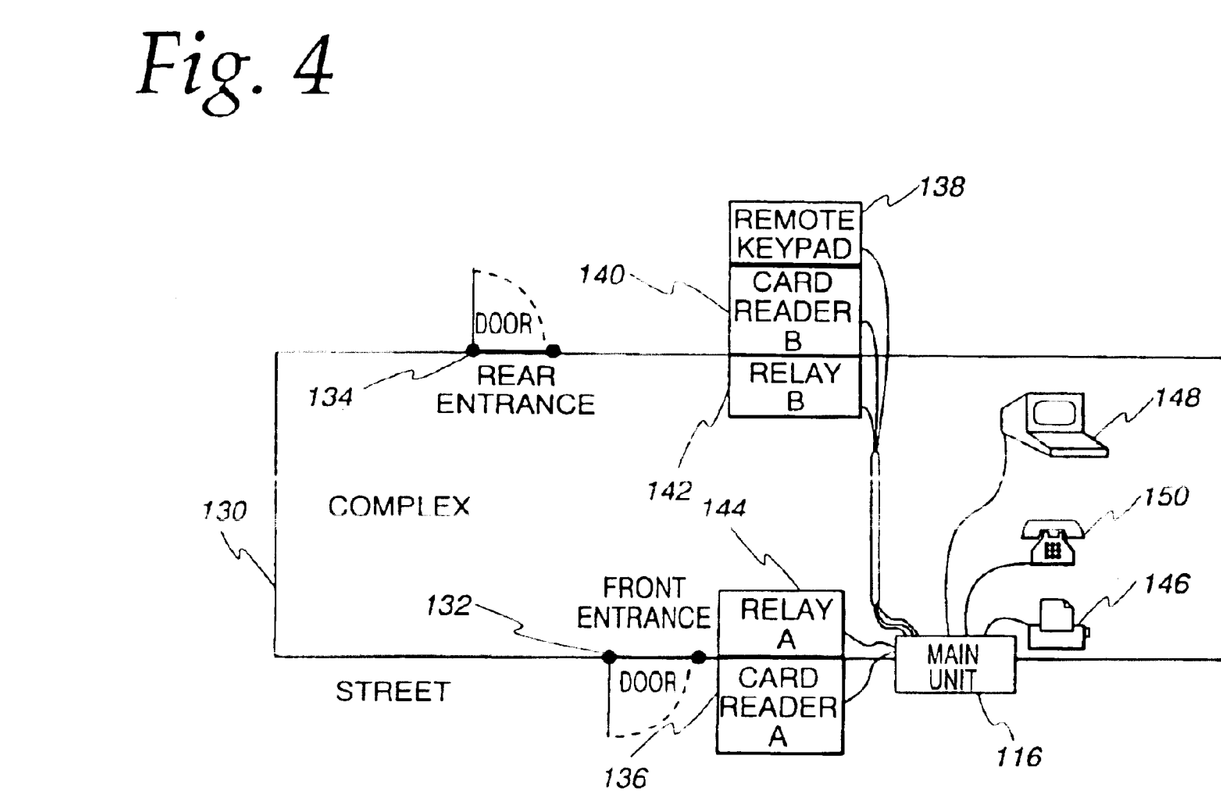
FIG. 4 shows an example of a minimum TES configuration.

FIG. 4 shows an example of a building 130 with a minimum TES configuration. Building 130 includes a front door 132 and a rear door 134, access through both of which is controlled directly by a main control unit 116. In this example, a card reader 136 is provided at the front door 132 for requesting access and a remote keypad 138 is at the rear entrance 136 for exit. Also, in this example of a simple TES, a card reader 140 is included at the rear entrance 136. Remote entry relays 142, 144 are provided, each controlled by the main control unit 116, to remotely open/lock the respective front entrance 132 and rear entrance 134.

Additionally, the access control system of this example includes a printer 146, a computer terminal 148 and a telephone 150 connected to the main unit 116. The printer 146 is included for printing out periodic reports, periodic system dumps or diagnostics information. The computer terminal 148 may be used with an interface program such as SPSWin from Sentex Systems for example, to program the control unit 116 and maintain data in databases. Telephone 150 provides another point of internal access to the system telephonically and, correspondingly, to building tenants connected to the system. Also, the main control unit 116 accesses an external telephone system, e.g. for fax/modem communications functions.

The TES records all transactions including telephone calls and any other system activity and may send a report in any number of ways. For example, the fax modem may be used to fax the report to a remote fax machine, the printer may print the report locally, the display may display the report or, the modem may send the report to a remote computer terminal. Logged transactions may include any activity such as visitor directory calls, tenant entry references (whether granted or denied), card or code activity and any other activities whether at the main control unit or a peripheral control unit that the system manager may select. Further, reports may be scheduled for automatic transmission, at a previously selected time to a previously selected destination.

Figure 5:
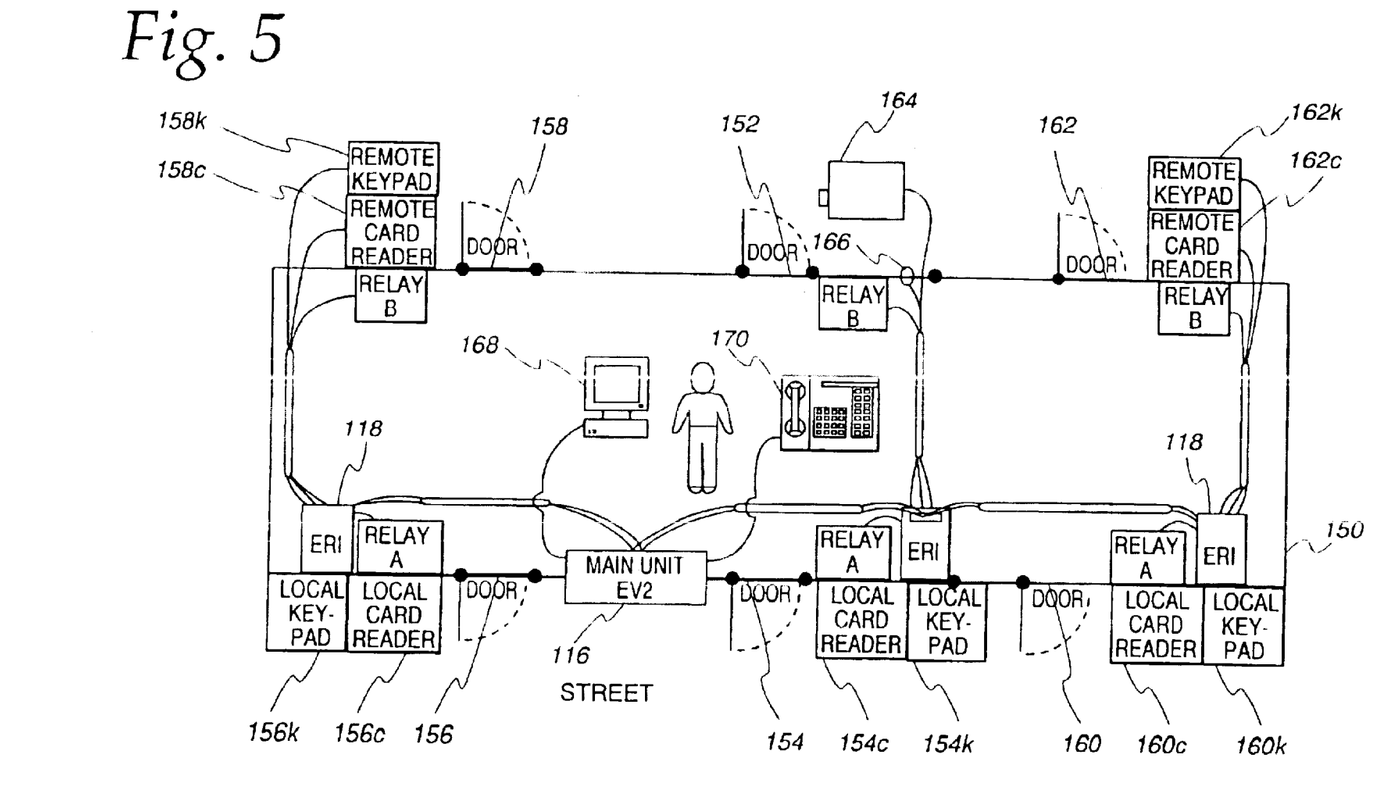
FIG. 5 is an example of a building with a multiple access point TES.

FIG. 5 shows an example of an expanded access control system controlling multiple access points in Building 150. In this example, a single main control unit 116 communicates with two peripheral units 118 to control remote entry. Main unit 116 controls both peripheral units 118 and directly controls access to central doors 152, 154. Each peripheral unit 118 controls access to a remote pair of doors 156, 158 and 160, 162. Further, each of a remote keypad 154k, 156k, 158k, 160k, 162k and a card reader 154c, 156c, 158c, 160c, 162c is located at each of the entrances 154, 156, 158, 160 and 162. In this example, a closed circuit television camera (CCTV) 164 connected to main unit 116 is located at entrance 152, for monitoring activity at that entrance. A button 166 may be located at door 152 to request exit from the building. A closed circuit TV monitor 168 is located internally to the building for monitoring activity at entry 152, e.g., by a guard and for granting access to entrance 152. The guard may authorize entry through telephone 170, through a dedicated input device (e.g., a button), through a computer or through any other appropriate device. Each of remote peripheral units 118 and main unit 116 controls a pair of relays labeled A and B, each of which remotely opens/closes or locks/unlocks a respective one of the doors.

Each of the main control unit 116 and any connected peripheral units 118 may be configured for one-door control or two-door control. For one-door configuration, the unit controls one door for entry or exit and includes three other relays that are available for other functions such as, shunting or bypassing an alarm, triggering an alarm or activating a closed circuit TV. For a two-door configuration two relays are available for shunting or rerouting an alarm.

When a tenant swipes a card or enters a code, the TES response may include one or more relay actions, e.g., a door will cycle, the CCTV will cycle on, etc. A relay activation structure (RAS) controls relay responses to entry cards or codes. Each RAS defines one or more relay responses and is associated with an entry card or code. Relay commands are provided for programmable individual relay control and select relay response to an entry request. A cycle command causes a selected relay to respond by opening and then closing after a period of time, e.g., buzzing in someone to a locked building. A latch-open command energizes the relay, for example, to unlock the door and leave the door unlocked until prompted to reenergize the relay, thereby re-locking the door. A latch release command returns the relay action to a default setting, e.g., if the door is open after responding to a latch open command, issuing the latch release command returns the corresponding relay to the cycle state. An initial default state may be selected such that relay control is set to that default state upon system power up.

The system may monitor door status to determine whether it is held open more than a predefined maximum time and, otherwise, determine whether a controlled door is stuck open, i.e., a building security breach may have occurred. An open door condition may elicit an alarm call wherein using the modem, the system transmits an alarm message to a designated computer or to a fax machine. Alternately, the system response to an open door may be to close a relay that turns on an alarm light or that sounds a siren to inform a monitoring station of the perimeter breach.

When an alarm is triggered (e.g., because a door has been forced open), the preferred embodiment TES automatically sends an alarm message over the modem to a designated recipient e.g., a computer terminal or a fax machine. The alarm message typically includes an alarm unit ID to identify the open door so that the message recipient knows the alarm origination point. The alarm call unit ID is programmable in the TES as is the number of retry times for dialing the number. Also, alarms may be enabled or disabled, e.g., for maintenance purposes. In the event of an alarm, the preferred embodiment TES reports the alarm by calling a previously designated location, which may be a fax machine, a terminal connected through a modem, an alarm company or to a pager. If the location does not answer the call or the number is busy, the control unit repeatedly hangs up and redials the same number until the system connects or, until the redial retry number is met. If, alternately, a direct connection is provided to a computer, printer or other reporting device, the TES reports the alarm condition occurrence directly, posting or printing a message that indicates the occurrence, e.g., on the attached printer.

Figure 6:
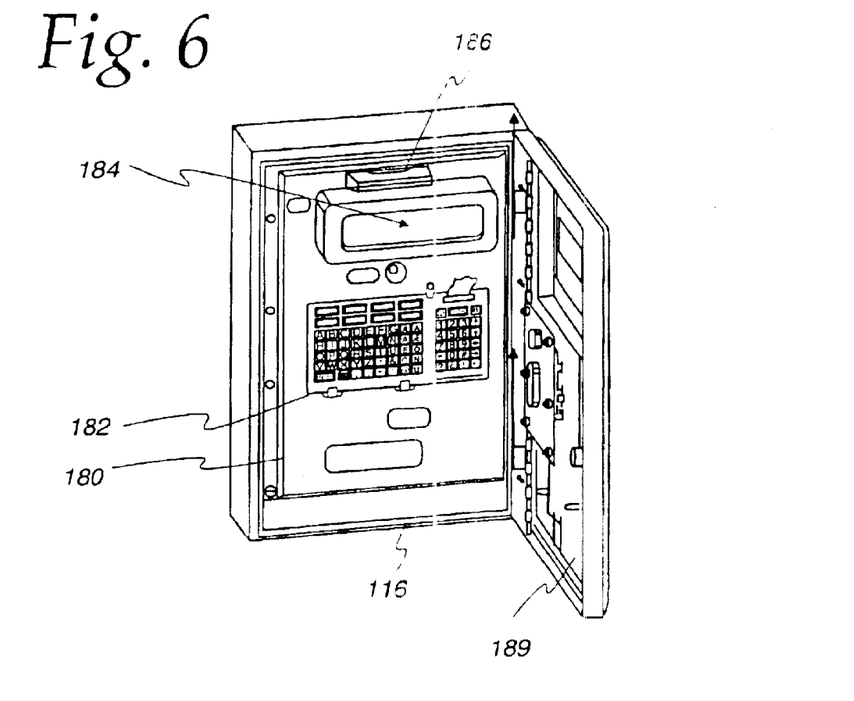
FIG. 6 shows a main control unit upper electronics assembly in an internal view.

FIG. 6 shows upper electronics assembly 180 in an internal view of an open main control unit 116. The upper electronics assembly 180 includes a detachable handheld keypad 182 and a display 184 which may be a liquid crystal diode (LCD) display. A pluggable memory module 186 is shown inserted at the top of the upper electronics assembly 180. The pluggable memory module 186 is, preferably, flash electronically programmable read only memory (Flash EPROM). Local audio communications may be effected in an intercom-like or speaker phone fashion through the faceplate of the main control unit 116 using a microphone 188 (in FIG. 2) and speaker 189.

Two types of data that may be saved or reloaded into the main control unit using the pluggable memory module 186. These two types of data include, unit data and operating data necessary for normal operation and is inserted during initial installation. Unit data includes user-generated data for the particular control unit. Such user-generated data may include code entries for tenants. Operating data includes any data required by the main control unit to operate. A backup module may be inserted periodically to backup/restore unit or operating data from/to the control unit memory. The backup module also may be used for upgrading the control unit operating system.

Figure 7:
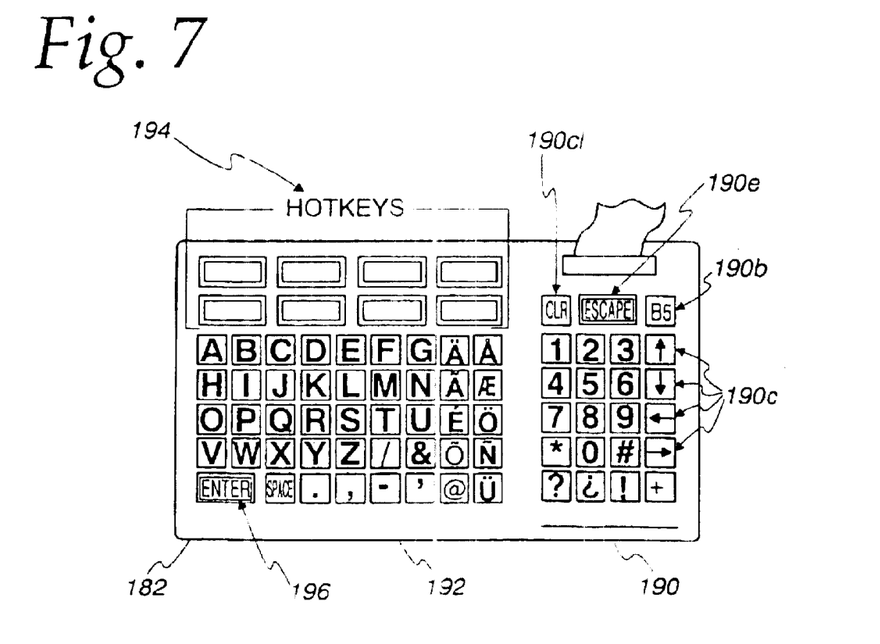
FIG. 7 is an expanded view of the detachable handheld keypad.

FIG. 7 is an expanded view of the detachable handheld keypad 182 which is an alphanumeric keypad. The detachable handheld keypad 182 includes a numeric section 190 and an alphabetic section 192. The numeric section 190 includes several cursor keys 190c, a backspace key 190b, an escape key 190e and a clear key 190cl. The cursor keys 190c facilitate navigating between displayed menu entries, e.g., on the display 184 in FIG. 5. The backspace key 190b functions to eliminate a single previously entered number or character at a time. The escape key 190e may be used for canceling an erroneously entered command key sequence and/or terminating a command, i.e., aborting. A single stroke of the clear key 192cl clears displayed entries.

The alphabetic section 192 includes several hot keys 194, typical alphabetic keys and an enter key 196 as well. The hot keys 194 include a number of shortcut keys for bypassing menu navigation and directly selecting and initiating a previously stored procedure. Hot keys 194 may include, for example, an enter phone number key for adding a new phone number to the stored listing; a delete phone number key may be included for removing entries from the list; and, an enter code key and a delete code key may be included for adding/removing codes from the listing. Card authorization may likewise be managed with enter card and delete card keys. A time/date key may be included for recalling and updating system time. A transaction key may be included for recalling and viewing logged system activity such as for example, visitor to tenant directory calls, tenant entry (granted or denied) and card or code activity. While each of these corresponding commands may be otherwise effected through a series of alphanumeric key entries, hot keys 190 provide a much simpler faster shortcut.

Figure 8:
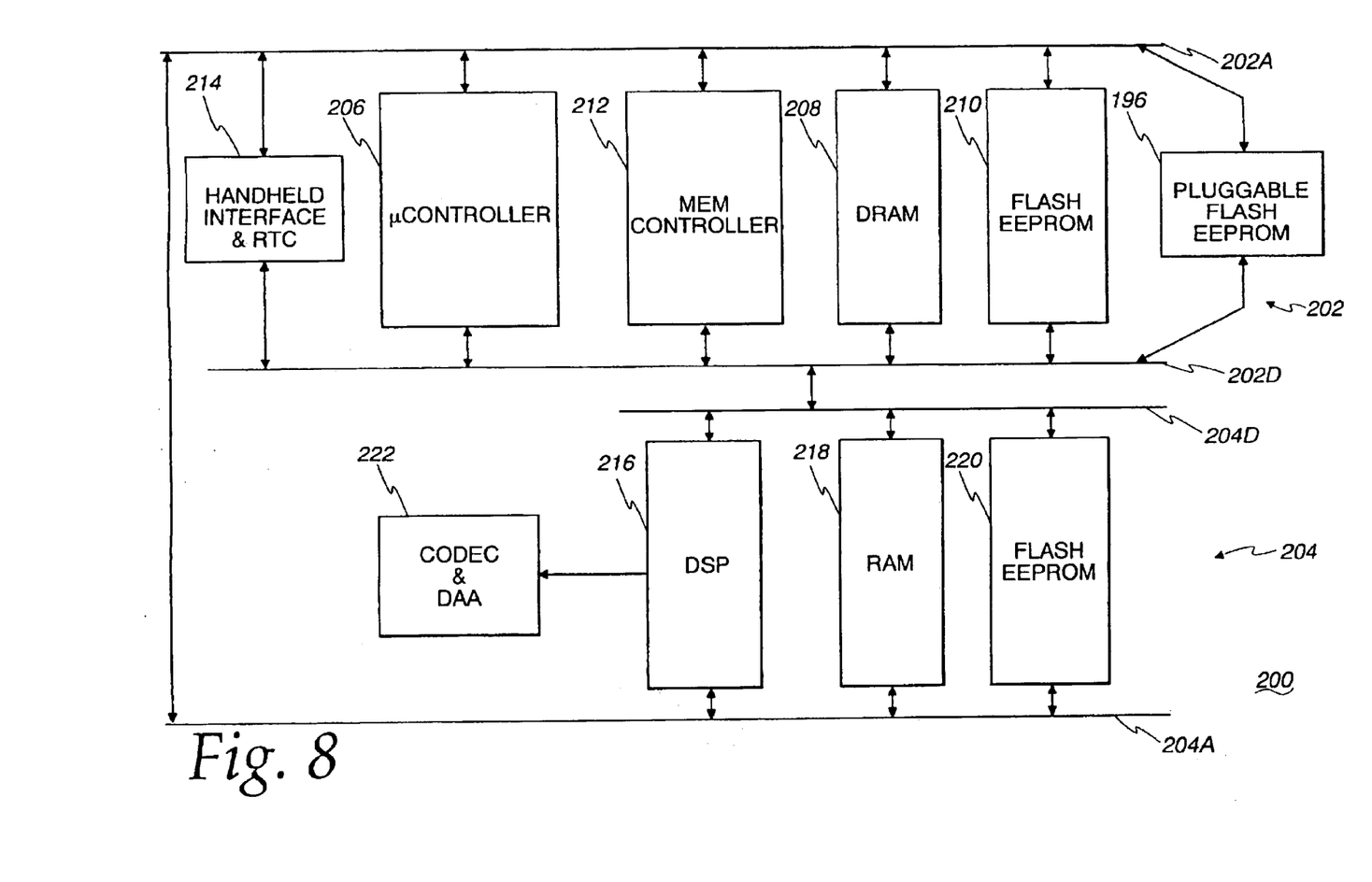
FIG. 8 shows a block diagram of a motherboard enclosed in the main control electronics assembly.

FIG. 8 shows a block diagram of the motherboard 200 of the electronics assembly according to the preferred embodiment of the present invention. The motherboard 200, essentially, includes two subsystems, a control subsystem 202 and a signal processing subsystem 204. Further, each subsystem 202, 204 includes an address bus 202A, 204A and a data bus 202D, 204D.

The control subsystem 202 includes a microcontroller 206, which may be a general purpose microprocessor or, preferably, is a 16-bit, single chip controller such as the XA-S3 microcontroller from Philips Semiconductors. The control subsystem 202 includes memory, preferably, both dynamic random access memory (DRAM) 208 and Flash EPROM 210. If necessary, a memory controller 212 may be included for controlling access to and refreshing the DRAM 208 or, if the microcontroller 206 is capable, the memory control function may be provided directly by the microcontroller 206. When installed in the main control unit 116 with the motherboard 200, the pluggable flash memory module 186 in FIG. 7 is also included in the memory in the control subsystem 202. A real time clock (RTC) and peripheral interface 214 also is included in the control subsystem 202.

The microcontroller 206 in control subsystem 202 manages a programable transaction auto reporting function to automatically send a record of all transactions that are currently stored in the main control unit memory at the preselected time to a selected destination, e.g., to a terminal, fax or a printer. Transactions may include records of system activity such as a directory call, an open door, entry card or code activity, etc. Auto reporting may be triggered by count number, a specified day or time or, a combination of transaction count and day/time. Count only scheduling triggers a report automatically when the count reaches a specified number of transactions, as selected by the complex manager, for example. When the transaction count reaches that number, the transactions report is transmitted to the destination. If day/time reporting is selected, all log transaction are transmitted on a selected day and time. Count and day/time reporting allows transaction report transmission if the count reaches a selected level prior to the scheduled day/time.

As noted above, system transactions or records of system activity include records of events such as a directory call, an open door, entry card or code activity or anything else identified as system activity for logging or reporting. Reports are transmitted, for example, to a printer, a fax machine or a computer terminal. Since computer terminals do not have identical modem transmission capabilities, the preferred embodiment TES has a programmable baud rate, selectable for a particular computer terminal or printer. Optionally, the preferred embodiment TES may send transaction information in real time. Further, real time transmission may be programmed to begin at some future time and continue until the system receives a termination command to end real time transmission. Also, interactive report transmission may be selected to require a response to a manual prompt at the time of transmission. Thus, when the programmed transmission time occurs, the prompt is presented to an operator, e.g., the building manager, who may approve or deny transmission.

The heart of the signal processing subsystem 204 is a digital signal processor (DSP) 216, preferably, 24-bit DSP 56303 from Motorola Corporation. The digital signal processor 216 is connected to memory such as, for example, static RAM (SRAM) 218 and Flash EPROM 220. The digital signal processor 216 interfaces externally to the main control circuit 200 through a communications interface 222.

The main control unit communicates with the outside world through any number of connected optional interface devices that may be connected to the real time clock (RTC) and peripheral interface 214 or to the communications interface 222. The DSP data bus 204D is selectively connectable to the control data bus 202D and the DSP address bus 204A is selectively connectable to the control address bus 202A.

In particular, the RTC and peripheral interface 214 communicates with connected remote units, e.g., peripheral unit 118 above. Also, connected input/output (I/O) devices such as a display, e.g., an LCD display 184, an RS422 printer port, an RS232 serial port, keypads including handheld keypad 182, and card readers all communicate with and are controlled by the microcontroller through RTC and peripheral interface 214. Further, a real time clock in the RTC and peripheral interface 214 maintains current date and time information that may be used, for example, in logging or in timed operation. Programmable Time Zones are defined as time periods during which particular access codes and card codes are enabled. So, if a group of tenants is intended to have access to the complex only during certain hours and/or on certain days of the week, a time zone may be identified for those specific periods and that time zone assigned to that group of tenants. Each time zone may have four different schedules/segments with a maximum of fifteen different time zones. Further, holidays may be identified and included or excluded from particular time zones.

Also, a timed control system may be included for setting relay controls to automatically open/close or enable/disable certain connected functions or features at preselected periods. Thus, for example, the system may automatically unlock and open the front gate daily and later re-lock or close the gate, at times that are specified within the system. So, continuing this example, the front gate may automatically open at 7:00 am and close at 7:00 pm. Further, typical holidays may be identified such that the gate does not automatically open even if a holiday falls on a weekday. A free exit may be provided through any monitored door such that opening the door to exit does not cause a door forced opened condition during the exit. A post office and fire department entry feature referenced to as a postal lock provides access using a lock and key. The local fire department may have a common key that allows access through the postal lock. Access to the complex using either of these is through the access control system and treated as a normal entry.

Communication interface 222 provides both audio and telephonic communications interface functions. Audio communications may include sound from the main control unit microphone and speaker. Both the microphone and speaker volume may be controlled programmably. Telephonic communications may include a modem/fax modem function and providing a telephone handset interface for either or both of touch tone or rotary dial type telephones.

The modem provides for both incoming as well as outgoing communications. The modem may be set to answer an incoming call after a selected number of rings. A preselected length may be set for visitor to tenant calls to prevent unintentionally tying up the line by leaving a call connected indefinitely, blocking other calls to the tenant as well as to the control unit. Dialing may be selected for either touch tone or a pulse dialing depending upon local telephone company capabilities. If Caller ID is available, incoming telephone numbers may be logged for each call along with any corresponding system/tenant response or action.

If a voicemail system is attached to the TES, voicemail may be configured from the main control unit. Also, voicemail may be programmed to intercept calls and to screen visitors for tenants. To use this voicemail control feature of the preferred embodiment system, a visitor places a tenant call and the voice mail system answers the call. Then, the visitor can bypass voicemail and contact the tenant by dialing an extension (a number with up to six digits) on the front panel keypad. If Caller ID is available through the local telephone service, the system may retrieve the caller's number for the tenant to return the call later. A PBX enable/disable and dial-in feature provides call configuration capability to dial a number for outside access, e.g., 9. A dial-up unit ID feature allows assignment of a 6-digit identification number such that a person dialing into the unit can retrieve the unit ID to determine whether the caller has contacted the correct unit.

The preferred embodiment access control system includes the capability to provide audible signals, e.g., beeps, in response to various inputs. So for example, an access granted beep may be provided by the main control unit speaker when granting tenant/visitor access. Also, talk time beeps on the telephone may indicate when visitor to tenant communication approaches the end of the selected talk period. These audible alerts may be disabled or enabled as desired.

In addition, the access control system according to the preferred embodiment of the present invention may facilitate information exchanges and other communications between itself and other systems such as a general purpose computer running a personnel or bookkeeping system. As described in detail in "Access Control Systems In Seamless Communication With Personnel Management Systems and The Like" to Dow et al. U.S. patent application Ser. No. 09/984,344, assigned to the assignee of the present invention and filed coincident herewith.

Accordingly, FIG. 9 shows a building 230 with access controlled by a preferred embodiment access control system in communication with a remotely located fax machine 232. Access to front entrance 234 is controlled by a main control unit 236 monitored adjacent to entrance 234. Access to garage entrance 238 is through card entry reader 240. Thus, the access control system and especially main control unit 236 may be programmed as described hereinabove such that when 250 accesses to garage entrance 238 occurs for example the log is transmitted to remote fax machine 232. Upon receipt of fax at fax machine 232 a fax may be reviewed and if anything of note is included in the fax that may be forwarded to proper authorities or, otherwise, the fax may be stored for later disposal or subsequent use if needed.

Accordingly, the above described access control system allows unlisted numbers. Tenants wanting to control who contact them have a private tenant number to which they may restrict knowledge. Thus, tenants may control distribution of their number in any way that they choose.

Having thus described preferred embodiments of the present invention, various modifications and changes will occur to a person skilled in the art without departing from the spirit and scope of the invention. It is intended that all such variations and modifications fall within the scope of the appended claims. Examples and drawings are, accordingly, to be regarded as illustrative rather than restrictive.

What is claimed is:

1. An access control system selectively providing access to a building, said access control system comprising:

a main control unit telephonically in communication with entities within a building, said main control unit being mountable at an entrance to said building;

a display on said main control unit displaying contact codes for selected ones of a plurality of building tenants;

at least one code entry unit receiving access codes, each said code entry unit providing received said access codes to said main control unit; and at least one controlled door, access through each said controlled door being provided by said main control unit in response to a correct access code entered at one said code entry unit, said main control unit logging system activity;

whereby building tenants may select whether a corresponding contact code is displayable on said display, visitors to said building viewing a list of displayable contact codes, remaining ones of said contact codes being unviewable on said display.

2. An access control system as in claim 1, wherein one of said at least one code entry units is a keypad located on said main control unit.

3. An access control system as in claim 2 wherein said at least one controlled door is two or more controlled doors, said main control unit controlling and logging access through said controlled doors at entrances to said building, at least one of said entrances including a remote said code entry unit.

4. An access control system as in claim 3 wherein said remote code entry unit is a keypad, said main entry unit logging keypad entries.

5. An access control system as in claim 3 wherein said remote code entry unit is a card reader, said main control unit logging card reader entries.

6. An access control unit as in claim 3 further comprising a peripheral control unit in communication with said main control unit, said peripheral control unit controlling at least one remotely controlled door at an entrance remotely located from said main control unit, said main control unit logging peripheral control unit activity.

7. An access control unit as in claim 6 further comprising a remote said code entry unit at said remotely controlled door, said remote code entry unit communicating with said main control unit through said peripheral unit.

8. An access control system as in claim 7 wherein said remote code entry unit is located external to said building, entry requests being placed by entering an access code at said remote code entry unit.

9. An access control unit as in claim 8 wherein said remote code entry unit is a card reader.

10. An access control system as in claim 8 wherein said remote code entry unit is a keypad.

11. An access control unit as in claim 8 further comprising a second remote code entry unit located internal to said building, access code entries to said second remote code entry unit requesting exit from said building, said main control unit authenticating access codes, said peripheral unit opening said remote controlled door responsive to authenticated access codes being entered in either said remote code entry unit, each entry and exit at said remote controlled door being logged.

12. An access control system as in claim 2 further comprising a monitor connected to said main control unit, said main control unit displaying system information on said monitor.

13. An access control unit as in claim 2 further comprising a closed circuit TV camera, said closed circuit TV camera being remotely controlled by said access control system, each activation of said closed circuit TV being logged.

14. An access control system as in claim 2 wherein said display further selectively displays a menu of available options, selection of selected ones of said options being logged.

15. An access control system as in claim 14, the main control unit further comprising:

a microphone receiving a voice communications from persons requesting building access; and a speaker providing audio responses to said persons requesting building access.

16. An access control system as in claim 14, the main control unit further comprising:

a memory module;

an electronics assembly adapted to receive said memory module, said memory module being pluggable into said electronics assembly, said display being attached to said electronics assembly; and an alphanumeric keypad, said access control system being programmed directly from said alphanumeric keypad, access control codes being programmed into said main control unit using said alphanumeric keypad, program entries being selectively communicated, seamlessly, to said general purpose computer.

17. An access control system as in claim 16 wherein said electronics assembly unit comprises:

a control subsystem controlling connected peripheral units and controlled doors, display of tenant codes, contacting a corresponding tenant in response to an entered contact code, receiving and authenticating access codes, monitoring unauthorized accesses and logging said system activity; and a communication subsystem passing voice communications telephonically between said entities within said building and individuals seeking building access, said communication subsystem including said fax modem and sending and receiving faxes with a said fax modem.

18. An access control system as in claim 17 wherein said control subsystem comprises:

a microcontroller controlling building access, communicating access authorization changes to the general purpose computer and changing access code data in response to communications from said general purpose computer;

memory storing current contact and access codes, system related program code, data and system logs;

a handheld interface and real time clock communicating with said general purpose computer; and said memory module, program initialization data and operating codes contained in said memory module.

19. An access control system as in claim 18 wherein said memory includes Flash EPROM and dynamic random access memory.

20. An access control system as in claim 17 wherein said communication subsystem comprises:

a digital signal processor, said digital signal processor being capable of functioning as a fax modem;

memory storing code for said digital signal processor; and a communications interface providing a voice interface with said microphone and audio interface with said speaker at said main control unit and providing a telephonic interface to a connected telephone system responsive to said digital signal processor.

21. An access control system as in claim 20 wherein a selected condition in said control subsystem causes said communication subsystem to fax a report to a remote location.

22. An access control system selectively providing access to a building, said access control system comprising:

a main control unit telephonically in communication with entities within a building, said main control unit being mountable at an entrance to said building;

a display on said main control unit displaying contact codes for selected ones of a plurality of building tenants; and said main control comprises a controller responsive to building tenant interaction for inhibiting the display of contact codes of selected building tenants.

* * * * *